US008873749B2

(12) United States Patent
Jho et al.

(10) Patent No.: US 8,873,749 B2
(45) Date of Patent: Oct. 28, 2014

(54) MULTI-USER SEARCHABLE ENCRYPTION SYSTEM AND METHOD WITH INDEX VALIDATION AND TRACING

(71) Applicant: Electronics and Telecommunications Research Institute, Daejeon (KR)

(72) Inventors: Nam-Su Jho, Daejeon (KR); Ku Young Chang, Daejeon (KR); Do Won Hong, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 33 days.

(21) Appl. No.: 13/705,666

(22) Filed: Dec. 5, 2012

(65) Prior Publication Data
US 2013/0148803 A1 Jun. 13, 2013

(30) Foreign Application Priority Data

Dec. 9, 2011 (KR) ........................ 10-2011-0132068

(51) Int. Cl.
*H04L 9/00* (2006.01)
*H04L 9/08* (2006.01)
*H04L 9/30* (2006.01)

(52) U.S. Cl.
CPC ............ *H04L 9/0861* (2013.01); *H04L 9/3073* (2013.01)
USPC .......................................................... 380/44

(58) Field of Classification Search
None
See application file for complete search history.

(56) References Cited

U.S. PATENT DOCUMENTS

| 8,015,211 | B2* | 9/2011 | Marceau et al. ............... 707/802 |
| 8,612,339 | B2* | 12/2013 | Rose et al. ....................... 705/38 |
| 2009/0034742 | A1* | 2/2009 | Appenzeller et al. .......... 380/279 |
| 2009/0113213 | A1* | 4/2009 | Park et al. ....................... 713/189 |
| 2009/0234848 | A1* | 9/2009 | Leff et al. ........................... 707/5 |

FOREIGN PATENT DOCUMENTS

KR 10-2005-0099751 A 10/2005

OTHER PUBLICATIONS

Feng Bao et al., "Private Query on Encrypted Data in Multi-User Settings", ISPEC Magazine, 2008, pp. 71-85.
Changyu Dong et al., "Shared and Searchable Encrypted Data for Untrusted Servers", Journal of Computer Security, 2011, pp. 367-397, vol. 19—No. 3.

* cited by examiner

*Primary Examiner* — Teshome Hailu
*Assistant Examiner* — Thanh Le

(57) ABSTRACT

A multi-user searchable encryption system includes a key generation center to issue a private secret key to a user and trace information regarding a user who has generated an index, and a user terminal device to generate an index for searching for a database using the private secret key. The multi-user searchable encryption system includes a database (DB) server that verifies the index generated by the user terminal device and searches for corresponding data to the verified index.

4 Claims, 2 Drawing Sheets

MULTI-USER SEARCHABLE ENCRYPTION SYSTEM AND METHOD WITH INDEX VALIDATION AND TRACING

RELATED APPLICATION(S)

This application claims the benefit of Korean Patent Application No. 10-2011-0132068, filed on Dec. 9, 2011, which is hereby incorporated by reference as if fully set forth herein.

FIELD OF THE INVENTION

The present invention relates to a multi-user searchable encryption technique, and more particularly, to a searchable encryption method and system which are capable of verifying an index generated by each user and tracing a user who has generated an index in a database used by multiple users.

BACKGROUND OF THE INVENTION

Recently, as the information society has been advanced, the amount of data processed by individuals, business, and the like has been increased, and thus, costs required for efficiently managing such data have also been considerably increased. However, it is not in reason to impose costs required for such information management on every member of the information society, and thus, cases of storing information by utilizing an external database service has been gradually increased. However, the utilization of an external database has an arising problem that an external database is not reliable as can be seen from a case of a data spill or the like which is frequently generated recently, so a proposal of a solution thereto has emerged as a very critical issue.

Various methods have been proposed as solutions, and among them, a method highlighted as the most perfect solution is encrypting all the data stored in a database. An encryption system theoretically guarantees secrecy of encrypted data, thus securing secrecy of all the stored data. That is, it means that, although an external attacker or a database manager obtains stored encrypted data, it cannot obtain actually meaningful information.

This encryption of data is a method that perfectly guarantees confidentialness of stored information, but has shortcomings that various services provided by a database server cannot be provided. In other words, if information is encrypted by using a general encryption technique, searching, calculation, and the like cannot be performed on data stored in the database, and thus, in order to perform a particular operation on data, a user should receive all the data stored in a server and perform decrypting thereon by himself before performing the operation.

Meanwhile, a searchable encryption technique is an encryption technique devised to search for data including a particular keyword while guaranteeing confidentialness of the data. Since various functions provided in a database are based on searching for information including particular keywords, a searchable encryption system is considered to be the most potential solution to the foregoing problems.

Research into a searchable encryption system was formalized in the early 2000s, and currently, a searchable encryption system includes four steps such as 'key setting step', 'encryption and index generation step', 'trap door generation step', and 'searching step'. Each step will be described in detail as follows. In the key setting step, a user sets every variable required for the system and prepares an encryption/decryption key and a secret key to be used for searching. In the encryption and index generation step, the user encrypts given data by using the encryption key and the given data, and generates an index to be used for searching later. Here, encrypted data and index are stored in an external database. In the trap door generation step, the user generates a trap door to be used for searching for data by using the secret key of the user and a keyword desired to be searched, and here, it is designed such that a server cannot obtain information regarding the keyword desired to be searched from the trap door. Finally, in the searching step, the server searches for data desired by the user by using the given trap door and stored index. In the searching step, the server is designed to recognize only whether or not the stored data is the user desired data and to be prevented from recognizing any information regarding the user searched keyword or content of the stored data.

As for the searchable encryption system, a searchable encryption system based on a symmetric key was first researched. The symmetric key-based searchable encryption system uses the same secret key for index generation and searching, and therefore, only a user owning a secret key performs an encryption and index generation step. That is, the symmetric key-based searchable encryption system may be considered to be a technique for allowing a single user to effectively manage data owned by the user through an external database. Thereafter, a public key-based searchable encryption system in which a public key for performing an index generation step is different from a secret key used for searching was researched. Since the public key-based searchable encryption system allows a certain data provider to generate an index and ciphertexts by using a public key, it can be used in various applications in comparison to the symmetric key-based searchable encryption system.

A future computing environment is changing to a cloud computing environment in which all the operations are processed by cloud servers. The biggest issue in the cloud computing is to guarantee confidentiality of data concentrated on the cloud server, which essentially requires an application of a searchable encryption system.

However, it is difficult to effectively protect data utilized in a multi-user computing environment represented by cloud computing only with the existing symmetric key or public key-based searchable encryption systems. A searchable encryption system for a multi-user environment requires a method for allowing multiple users to freely encrypt and provide their own data and freely search for data encrypted by different users. In the multi-user searchable encryption system, since multiple users may freely provide and search for data, various requirements, other than requirements of a general symmetric key-public searchable encryption system, exist. When multiple users share data through a database, the most critical issue is to authenticate data stored in the database. In other words, if inappropriate data is found, a user providing such data can be traced. In addition, in order to clarify where the responsibility for inappropriate data lies, a process of verifying every index is required in the course of storing data in a server. However, the multi-user searchable encryption system developed to date does not take such a data verification and tracing function into consideration.

SUMMARY OF THE INVENTION

In view of the above, therefore, the present invention provides a multi-user searchable encryption method and system which are capable of verifying indices generated by respective users and tracing users who have generated indices in a database used by multiple users.

In accordance with an aspect of the present invention, there is provided a multi-user searchable encryption system, the system including: a key generation center configured to issue a private secret key to a user and trace information regarding a user who has generated an index; a user terminal device configured to generate an index for searching for a database by using the private secret key; and a database (DB) server configured to verify the index generated by the user terminal device, and search for corresponding data for the verified index, and provide the same.

The user terminal device includes the private secret key, which is secret information to encrypt data and generate the index.

The user terminal device generates a trap door from a keyword desired to be searched by using the private secret key.

The key generation center checks user's identifier by using the master secret key thereof to trace a user who has generated the index when there is a problem with the index generated by the user terminal device.

The DB server verifies validity of the generated index by using a public key provided from the key generation center, before storing the data in the DB when the user provides encrypted data.

The key generation center further issues a system parameter and a public key for verifying an index before issuing the private secret key and provides them to the DB server.

In accordance with another aspect of the present invention, there is provided a multi-user searchable encryption method, the method including: generating, at a key generation center, a master secret key, a public key, and a system parameter of the center; generating, at the key generation center, a private secret key for each user by using the master secret key thereof; tracing, at the key generation center, a user who has generated an index; generating, at a user terminal device of each user, an index by using the issued private secret key; generating, at the user terminal device, a trap door from a keyword desired to be searched from the database by using the private secret key of each user; verifying, at a DB server, an index generated by the user terminal device by using the public key provided from the key generation center; and performing searching on the database by using the index and the trap door.

In the method, the user terminal device includes the private secret key, which is secret information to encrypt data and generate the index.

In the method, the key generation center checks user's identifier by using the master secret key to trace a user who has generated the index when there is a problem with the index generated by the user terminal device.

BRIEF DESCRIPTION OF THE DRAWINGS

The above and other objects and features of the present invention will become apparent from the following description of preferred embodiments, given in conjunction with the accompanying drawings, in which.

DETAILED DESCRIPTION OF THE EMBODIMENT

Figure 1:
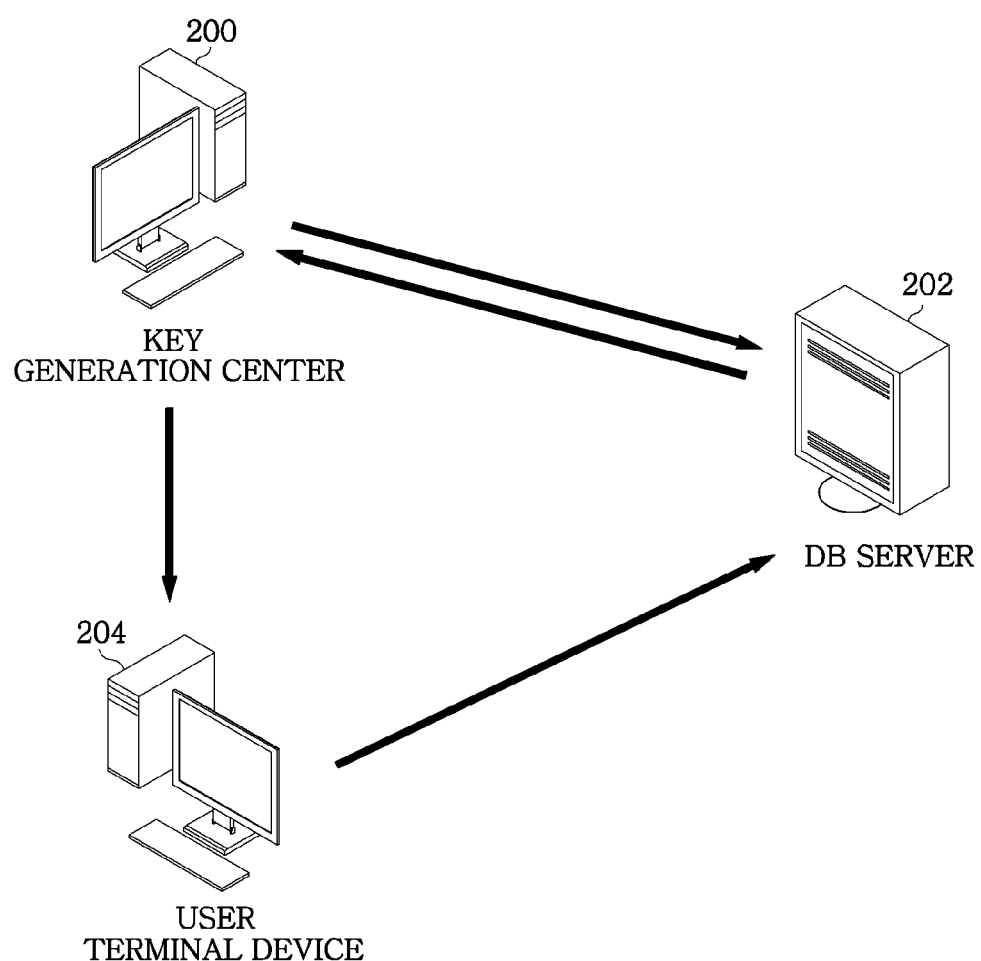
FIG. 1 is a view illustrating the configuration of a multi-user searchable encryption system in accordance with an embodiment of the present invention.

Hereinafter, embodiments of the present invention will be described in detail with the accompanying drawings. FIG. 1 is a view illustrating an operation flow in a multi-user searchable encryption system in accordance with an embodiment of the present invention.

Referring to FIG. 1, the multi-user searchable encryption system includes a key generation center (KGC) 200, a database (DB) server 202, and a user terminal device 204 used by multiple users $u_1, u_2, \ldots, u_n$.

The key generation center 200 issues a private secret key to a user, and identifier regarding a user who has generated an index. When there is a problem with the index generated by the user terminal device 204, the key generation center 200 checks identifier of the user terminal device 204 by using the master secret key thereof to trace the user who has generated the index. Further, the key generation center 200 issues a system parameter and a public key for verifying an index before issuing the private secret key, and provides them to the DB server 202.

The user terminal device 204 generates an index for searching a database by using the private secret key. In addition, in searching by using the index, the user terminal device 204 generates a trap door from a keyword desired to be searched by using the private secret key, and requests for searching by using the trap door.

The DB server 202, when the user provides encrypted data, verifies validity of the index generated by the user terminal device, by using the public key provided by the key generation center 202 before storing the encrypted data in a DB. Further, the DB server searches for data corresponding to the trap door, and provides the same to the user terminal device 204.

Figure 2:
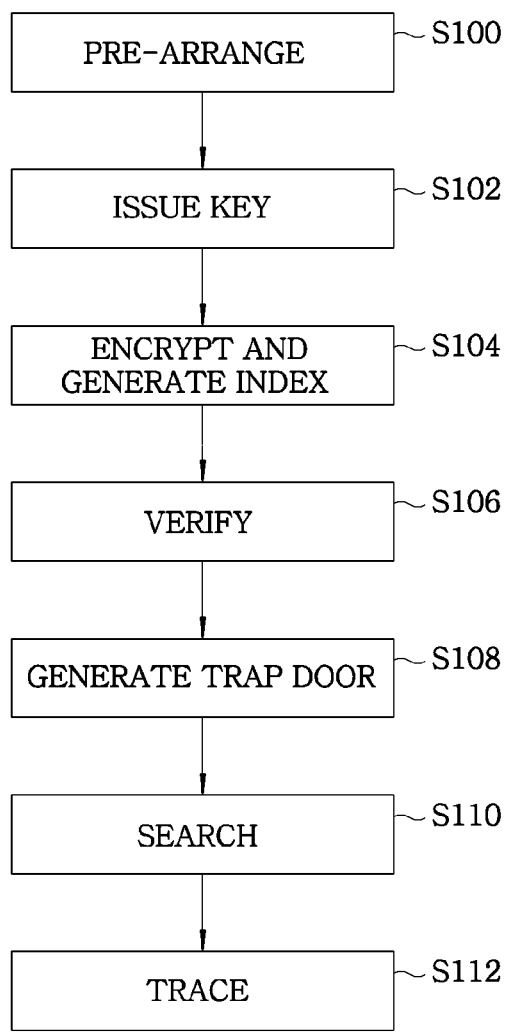
FIG. 2 is a flow chart illustrating an operation of the multi-user searchable encryption system in accordance with the embodiment of the present invention.

FIG. 2 is a flow chart illustrating an operation of the multi-user searchable encryption system in accordance with the embodiment of the present invention.

An operation of the multi-user searchable encryption system roughly includes a pre-arranging step S100 of generating a system parameter, issuing a public key, and the like, a key generation step S102, an encryption and index generation step S104, an index verification step S106, a trap door generation step S108, a searching step S110, and a tracing step S112.

First, the pre-arranging step S100 is performed by the key generation center 200. The key generation center 200 selects a certain prime number p, and selects a cyclic group $G_1 = <g_1>$, $G_2 = <g_2>$, $G_3 = <g_3>$ in which an order is p. Here, it is assumed that there is a bilinear map e: $G_1 \times G_2 \rightarrow G_3$. Also, the key generation center 200 selects two hash functions $H_1: \{0,1\}^* \rightarrow Z_p$ and $H_2: K \times \{0,1\}^* \rightarrow Z_p$. Here, however, K is a keyword space for searching.

The bilinear map (e) defined in the cyclic group $G_1$ and $G_2$ having the prime number p as an order may be defined as shown in Eq. (1) below:

$$e: G_1 \times G_2 \rightarrow G_3 \quad \text{Eq. (1)}$$

Bilinearity: $e(u^a, v^b) = (u,v)^{ab}$ for certain $u \in G_1, v \in G_2$ and two integers a and b.

Non-degeneracy: $e(g_1, g_2) \neq 1$ when $g_1$ and $g_2$ are constructors of $G_1$ and $G_2$.

Weil pairing, Tate pairing, or the like defined in an elliptic curve are an example of the bilinear map, and a method of configuring the cyclic group $G_1, G_2$, and $G_3$ for a certain order p has been well known and widely used, and thus a detailed description thereof in the present disclosure will be omitted.

The key generation center 200 selects a certain element h from $G_1$ and selects $z_1$ and $z_2$ satisfying Eq. (2) below from $Z_p$ and u and v from $G_1$.

$$u^{z_1} = v^{z_2} = h \quad \text{Eq. (2)}$$

Further, the key generation center 200 selects a certain integer t from $Z_p$ to calculate $w=(g_2)^t$. Finally, the key generation center 200 arbitrarily selects an encryption key SK to be used for encrypting data. The key generation center 200 provides (p, $G_1$, $G_2$, $G_3$, $g_1$, $g_2$, $g_3$, h, u, v, w) as public information to the DB server 202. The key generation center 200 stores ($z_1$, $z_2$, t, SK) as a master secret key thereof.

The key generation step S102 is executed by the key generation center 200. When the user ($u_i$) requests a key generation by using the user terminal device 204 or the like, the key generation center 200 selects a certain integer $x_i$ from $Z_p$ as shown in Eq. (3) below and calculates an $A_i$ value for the user.

$$A_i = (g_1)^{\frac{1}{t+x_i}} \qquad \text{Eq. (3)}$$

The key generation center 200 issues ($A_i$, $x_i$, SK) as a user secret key to the user $u_i$, and stores $A_i$ values for respective users as a list.

The encryption and index generation step S104 is a step executed by each user terminal device 204. Here, a case in which a user $u_i$ generates an index for data including a keyword k∈k will be described as an example. A final index generated by the user has a form of $\sigma = \langle g_3^d, g_3^{dH_2(SK,k)}, T_1, T_2, T_3, c, s_a, s_b, s_x, s_1, s_2 \rangle$ and each element is calculated as follows.

The user terminal device 204 selects a certain integer d from $Z_p$ and calculates as shown in Eq. (4) below:

$$M = (g_3)^d \| (g_3)^{dH_2(SK,k)} \qquad \text{Eq. (4)}$$

Further, after arbitrarily selecting a, b from $Z_p$, the user terminal device 204 calculates $T_1$, $T_2$, and $T_3$ as shown in Eq. (5) below:

$$T_1 = u^a,$$
$$T_2 = v^b,$$
$$T_3 = A_i h^{a+b} \qquad \text{Eq. (5)}$$

In addition, the user terminal device 204 arbitrarily selects $r_a$, $r_b$, $r_x$, $r_1$, $r_2$ from $Z_p$, and calculates $R_1$, $R_2$, $R_3$, $R_4$, $R_5$ as shown in Eq. (6) below:

$$R_1 = u^{r_a},$$
$$R_2 = v^{r_b},$$
$$R_3 = e(T_3, g_2)^{r_x} \cdot e(h, w)^{-r_a - r_b} \cdot e(h, g_2)^{-r_1 - r_2},$$
$$R_4 = T_1^{r_x} \cdot u^{-r_1},$$
$$R_5 = T_2^{r_x} \cdot v^{-r_2} \qquad \text{Eq. (6)}$$

Further, the user terminal device 204 calculates a challenge c value as shown in Eq. (7) based on the foregoing calculated value.

$$c = H_1(M, T_1, T_2, T_3, R_1, R_2, R_3, R_4, R_5) \in Z_P \qquad \text{Eq. (7)}$$

Subsequently, the user terminal device 204 calculates $s_a$, $s_b$, $s_x$, $s_1$, $s_2$ as shown in Eq. (8) below by using c and the selected $r_a$, $r_b$, $r_x$, $r_1$, $r_2$.

$$s_a = r_a + ca,\ s_b = r_b + cb,\ s_x = r_x + cx,\ s_1 = r_1 + cx_i a,\ s_2 = r_2 + cx_i b \qquad \text{Eq. (8)}$$

Finally, the user terminal device 204 generates an index σ as shown in Eq. (9) below, and transmits the same to the DB server 202.

$$\sigma = \langle g_3^d, g_3^{dH_2(SK,k)}, T_1, T_2, T_3, c, s_a, s_b, s_x, s_1, s_2 \rangle \qquad \text{Eq. (9)}$$

The index verification step S106 is executed by the DB server 202. The index verification step S106 is executed by the DB server 202 in order to verify an index which has been generated by and transmitted from the user. The DB server 202 calculates $R_1'$, $R_2'$, $R_3'$, $R_4'$, $R_5'$ as shown in Eq. (10) below by using the transmitted index $\sigma = \langle g_3^d, g_3^{dH_2(SK,k)}, T_1, T_2, T_3, c, s_a, s_b, s_x, s_1, s_2 \rangle$ and values $g_1$, $g_2$, h, u, v, w stored as public information.

$$R_1' = u^{s_a} \cdot T_1^{-c},$$
$$R_2' = v^{s_b} \cdot T_2^{-c},$$
$$R_3' = e(T_3, g_2)^{s_x} \cdot e(h, w)^{-s_a - s_b} \cdot e(h, g_2)^{-s_1 - s_2} \cdot (e(T_3, w)/e(g_1, g_2))^c,$$
$$R_4' = T_1^{s_x} \cdot u^{-s_1},$$
$$R_5' = T_2^{s_x} \cdot v^{-s_2} \qquad \text{Eq. (10)}$$

Subsequently, the DB server 202 calculates c' as shown in Eq. (11) below by using the calculated value.

$$c' = H_1(M, T_1, T_2, T_3, R_1', R_2', R_3', R_4', R_5') \qquad \text{Eq. (11)}$$

Then, the DB server 202 checks whether or not c'=c is satisfied. When c' is identical to c, the DB server 202 recognizes it as a proper index, and stores it therein, and when they are not identical, the DB server 202 refuses to store the improper index.

In the trap door generation step S108 executed by each user, a trap door as shown in Eq. (12) below is generated for a keyword k desired to be searched, and then transmitted to the DB server 202.

$$\text{Trapdoor} = H_2(SK, k) \qquad \text{Eq. (12)}$$

The searching step S110 is executed by the DB server 202 by using the trap door transmitted from the user terminal device 204 and the stored index. The DB server 202 checks whether or not $(g_3^d)^{\text{Trapdoor}} = (g_3)^{dH_2(SK,k)}$ is established for the received trap door and a first part of the index $(g_3)^d$, $(g_3)^{dH_2(SK,k)}$. The index, for which the foregoing equations are identical, is transmitted as data identical to a searched keyword k to the user.

Finally, the tracing step S112 is executed by the key generation center 200. When data having a problem is found, the key generation center 200 performs the tracing step in order to trace a user who has generated the index. The key generation center 200 executes calculation as shown in Eq. (13) below on $T_1$, $T_2$, and $T_3$ among the given indices $$\sigma = \langle g_3^d, g_3^{dH_2(SK,k)}, T_1, T_2, T_3, c, s_a, s_b, s_x, s_1, s_2 \rangle.$$

$$A = T_3 / (T_1^{z_1} \cdot T_2^{z_2}) \qquad \text{Eq. (13)}$$

wherein, $z_1$ and $z_2$ are master secret keys generated by the key generation center 200 in the key setting step. The key generation center 200 traces the user who has generated the index by comparing the values $A_i$ provided from the respective users in the key generating step and the calculated A.

As described above, the present invention provides the searchable encryption method and system capable of verifying indices generated by respective users and tracing a user who has generated an index in a database used by multiple users, which can verify an encrypted index, as well as providing an effective method for searching encrypted data in a multi-user environment, and when stored data is discovered to have a problem later, a user who has provided the data can be traced, thus increasing security.

While the invention has been shown and described with respect to the embodiments, the present invention is not limited thereto. It will be understood by those skilled in the art that various changes and modifications may be made without departing from the scope of the invention as defined in the following claims.

What is claimed is:

1. A multi-user searchable encryption method, the method comprising:
generating, at a key generation center, a master secret key, a public key for the key generation center, and system parameters;
generating, at the key generation center, a private secret key using the master secret key for each user;
generating, at a user terminal device associated with each user, an index using the private secret key generated for the user;
verifying, at the database server, the indices generated at the user terminal devices by using the system parameters;
generating, at the user terminal devices, one or more trap doors for keywords to be searched e database using the private secret keys of each user;
searching for data within the database server using the index and the trap door; and
tracing, via the key generation center, each user who has generated an index.

2. The method of claim 1, wherein generating the index using the private secret key generated for the user includes generating the index by encrypting data using the private secret key associated with the user, the generated index including an identifier of the user in encrypted form.

3. The method of claim 1, wherein tracing via the key generation center, each user who has generated an index includes checking an identifier of the user terminal device for each user by using the private secret key in response to a problem associated with the index.

4. A non-transitory computer-readable storage medium whose contents, when executed by a computing system, cause the computing system to perform multi-user searchable encryption operations, the operations comprising:
generating, at a key generation center, a master secret key, a public key for the key generation center, and system parameters;
generating, at the key generation center, a private secret key using the master secret key for each user;
generating, at a user terminal device associated with each user, an index using the private secret key generated for the user;
verifying, at the database server, the indices generated at the user terminal devices by using the public key generated at the key generation center;
generating, at the user terminal devices, one or more trap doors for keywords to be searched in the database using the private secret keys of each user;
searching for data within the database server using the index and the trap door; and
tracing, via the key generation center, each user who has generated an index.

* * * * *